US008944084B2

(12) United States Patent
Basu et al.

(10) Patent No.: US 8,944,084 B2
(45) Date of Patent: Feb. 3, 2015

(54) OPTOFLUIDIC TWEEZERS

(75) Inventors: Amar Basu, Novi, MI (US); Gopakumar Kamalakshakurup, Detroit, MI (US)

(73) Assignee: Wayne State University, Detroit, MI (US)

(*) Notice: Subject to any disclaimer, the term of this patent is extended or adjusted under 35 U.S.C. 154(b) by 0 days.

(21) Appl. No.: 14/123,316

(22) PCT Filed: Jun. 4, 2012

(86) PCT No.: PCT/US2012/040662
§ 371 (c)(1), (2), (4) Date: Feb. 17, 2014

(87) PCT Pub. No.: WO2012/167221
PCT Pub. Date: Dec. 6, 2012

(65) Prior Publication Data

US 2014/0150887 A1 Jun. 5, 2014

Related U.S. Application Data

(60) Provisional application No. 61/493,102, filed on Jun. 3, 2011.

(51) Int. Cl.

| | |
|---|---|
| ***H01S 3/20*** | (2006.01) |
| ***F17D 3/01*** | (2006.01) |
| ***H05H 3/00*** | (2006.01) |
| ***B01L 3/00*** | (2006.01) |

(52) U.S. Cl.
CPC ............... *F17D 3/01* (2013.01); *B01L 3/50273* (2013.01); *B01L 3/502792* (2013.01); *B01L 2400/0448* (2013.01)
USPC .......... 137/13; 250/251; 250/428; 250/432 R; 422/63; 422/504

(58) Field of Classification Search
CPC ............ B41J 2/1652; B01L 3/502792; B01L 2200/0626; B01L 2400/0406; B01L 2400/0454; B01L 3/502784; H01J 49/0431
USPC .......... 250/251, 428, 432 R; 137/13; 422/63, 422/504
See application file for complete search history.

(56) References Cited

U.S. PATENT DOCUMENTS 7,358,051 B2 * 4/2008 Gianchandani et al. ... 435/287.2
7,582,858 B2 * 9/2009 Faris et al. .................... 250/251

(Continued)

OTHER PUBLICATIONS

Ohta A. T., et al., "Optically actuated thermocapillary movement of gas bubbles on an absorbing substrate," Appl Phys. Lett. Aug. 14, 2007; (91).

(Continued)

*Primary Examiner* — Nikita Wells
(74) *Attorney, Agent, or Firm* — Brinks Gilson & Lione

(57) ABSTRACT

In a method of moving droplets, local heat is applied to a surface portion of a droplet for an amount of time sufficient to create a Marangoni flow in the droplet. Droplets are suspended in an emulsion in a carrier liquid on a substrate. A laser beam is used to move one of the droplets. the droplet consists of a first substance and a carrier liquid consists of a second substance that is not mixable with the first substance. The droplet is placed in the carrier liquid, and the mixture is emulsified. The emulsified mixture is placed on a substrate. Then the local heat is applied to the surface of the droplet. The first substance may include oil and the second substance may include water.

18 Claims, 5 Drawing Sheets

(56) References Cited

U.S. PATENT DOCUMENTS

| | | | | |
|---|---|---|---|---|
| 7,670,560 | B2 * | 3/2010 | Neitzel | 422/504 |
| 2007/0281304 | A1 | 12/2007 | Gianchandani et al. | |
| 2008/0105829 | A1 | 5/2008 | Faris et al. | |

OTHER PUBLICATIONS

Rybalko S., et al., "Forward and backwardlaser-guided motion of an oil droplet," Physical Review E 70, 046301 (2004), Oct. 5, 2004.
International Search Report of PCT/US2012/04662 Aug. 28, 2012.

* cited by examiner

0ms
200 μm
100
102
104
106
108

3ms
106
108
110
112
114

40ms
100
106

60ms
100
104
108

70ms
114

80ms

OPTOFLUIDIC TWEEZERS

CROSS-REFERENCE TO RELATED APPLICATIONS

The present application is a National Phase Application of PCT Application No. PCT/US2012/040662, filed Jun. 4, 2012, which claims the benefit of U.S. Provisional Patent Application No. 61/493,102 filed Jun. 3, 2011,the content of which is hereby incorporated by reference in its entirety.

TECHNICAL FIELD

The present invention relates to optical techniques for droplet manipulation.

BACKGROUND

Optical techniques for droplet manipulation are attractive because they provide a contactless dynamic manipulation of droplets. and do not require specific substrate structures. Current approaches include, for example, so-called optical tweezers. Optical tweezers are not ideally suited for droplet manipulation because they exert a relatively low force on a droplet. The force that an optical tweezer can exert on a droplet ranges in an order of magnitude of picoNewtons (pN). For droplets of sizes of several hundreds of micrometers, such forces are insufficient to move the droplet at any significant velocity. Further, the forces have been found to be typically repulsive. Optoelectronic tweezers (OET) have been adapted to manipulated droplets with a force in a range of nanoNewtons (nN). Optoelectronic tweezers typically require on-chip electrodes providing an in-plane AC electric field.

SUMMARY

According to one aspect of the invention, a method of moving droplets includes the steps of providing a droplet; and applying local heat to a surface portion of the droplet for an amount of time sufficient to create a Marangoni flow in the droplet that causes the droplet to move toward the local heat. Marangoni flow is caused by a gradient of surface tension or interfacial tension that can cause forces exceeding several microNewtons.

According to a further aspect of the invention, the droplet consists of a first substance and a carrier liquid consists of a second substance that is not mixable with the first substance. The droplet is placed in the carrier liquid and placed on a substrate. Then the local heat is applied. In the context of the following description, a droplet is defined as consisting of a fluid, which may be a liquid or a gas.

According to another aspect, the second substance may be a polar liquid and the first substance may be a substantially nonpolar fluid. For example, the first substance may include oil and the second substance may include water.

According to one aspect of the invention, the droplet is placed in the carrier liquid by creating an emulsion of the first substance in the second substance.

In one example, the substrate is transparent. Then is it possible to apply the localized heat via a light beam originating under the substrate and propagating through the substrate. The light beam includes at least one wavelength for which both the substrate and the carrier liquid are transparent.

For a vertical movement of the droplet, the droplet may initially be suspended in the carrier liquid. Then the local heat is applied until the droplet contacts the substrate. Even after the droplet contacts the substrate, the application of local heat can be continued so that the droplet is trapped laterally.

For a horizontal movement of the droplet the light beam may be directed at a surface portion of the droplet in an off-center location, inside the perimeter of the projection of the droplet on a horizontal plane, in a direction substantially perpendicular to the top surface of the substrate.

According to one aspect of the invention, the local heat is applied by a laser generating a laser beam with a wavelength in the visible spectrum that is converted to heat upon contact with the droplet surface. The laser may, for example, be a diode laser. But the wavelength is not limited to the visible spectrum. It is preferable, however, that the carrier liquid is substatially transparent to the laser wavelength and that the droplet surface absorbs the laser wavelength at least in part for generating the local heat.

The wavelength penetrating the substrate and the carrier liquid may be in a range between about 400 nm and about 500 nm.

Preferably, the laser beam is focused with a focal spot size of less than about 130 μm. In particular, the focal spot size is smaller than about 70 μm. The focal spot size may even be smaller than about 30 μm.

Further details and benefits of the present invention become apparent from the following description of various preferred embodiments making reference to the attached drawings. The drawings are included for purely illustrative purposes and not intended to limit the scope of the present invention.

DETAILED DESCRIPTION OF THE INVENTION

Figure 1:
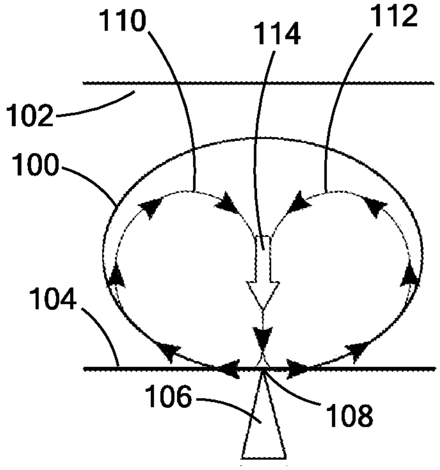
FIG. 1 illustrates a symmetric Marangoni flow generated by localized optical heating of an oil droplet.

Referring to FIG. 1, an oil droplet 100 is suspended in an aqueous carrier fluid 102 on a glass substrate 104. A laser beam 106 is focused on an interface 108 located on a bottom surface of the oil droplet 100. The localized laser beam 106 generates a local rise in temperature at an interface 108 on the bottom surface of the oil droplet 100. This localized heat causes a toroidal microvortex causing the droplet 100 to move toward the laser beam 106, as will be explained in connection with the subsequent drawings figures.

Figure 2:
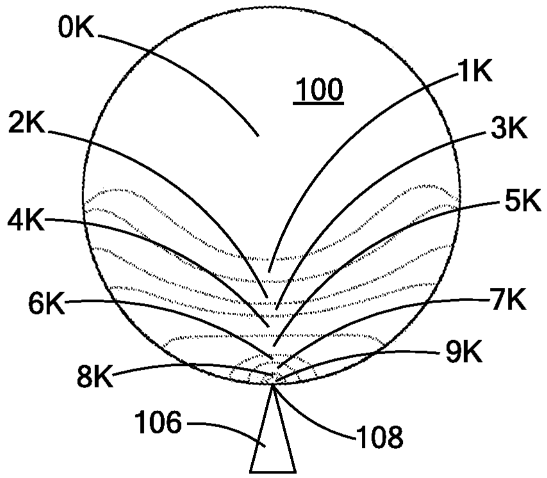
FIG. 2 shows an example of isothermal lines induced in an oil drop caused by localized optical heating.

FIG. 2 illustrates a cross-section of the oil droplet 100 with isothermal lines showing the thermal distribution of the laser energy in the oil droplet 100. The overall temperature gradient of the droplet 100 encompasses a temperature difference of less than about 10K. But at the location of the laser beam incidence at interface 108, the temperature gradient is steeper than remote therefrom, as evident from the denser arrangement of the isothermal lines. The local heat on the interface 108 increases the local temperature and consequently reduces the local interfacial tension (IFT), due to the generally prevailing inverse relation between IFT and temperature.

The locally reduced IFT generates an interfacial shear stress along the droplet surface, which drives the formation of the toroidal microvortex, of which two fronts 110 and 112 are shown within the droplet 100. The microvortex fronts 110 and 112 exert a shear force on the surrounding fluid and result in an overall force 114 pulling the droplet 100 toward the axis of the laser beam 106. Restoring forces are balanced when the droplet is aligned to the axis of the beam as illustrated by the symmetrical arrangement of FIG. 1, where all horizontal components of the microvortex fronts 110 and 112 cancel each other out. The overall force 114 keeps the droplet 100 trapped on the axis of the laser beam 106. The interaction of the laser beam 106 with the interface 108 thus acts as an optofluidic tweezer (OFT). The OFT is based on the Marangoni flow caused by the reduced surface tension or interfacial tension cause by the temperature gradient on the surface of the droplet 100.

Figure 3:
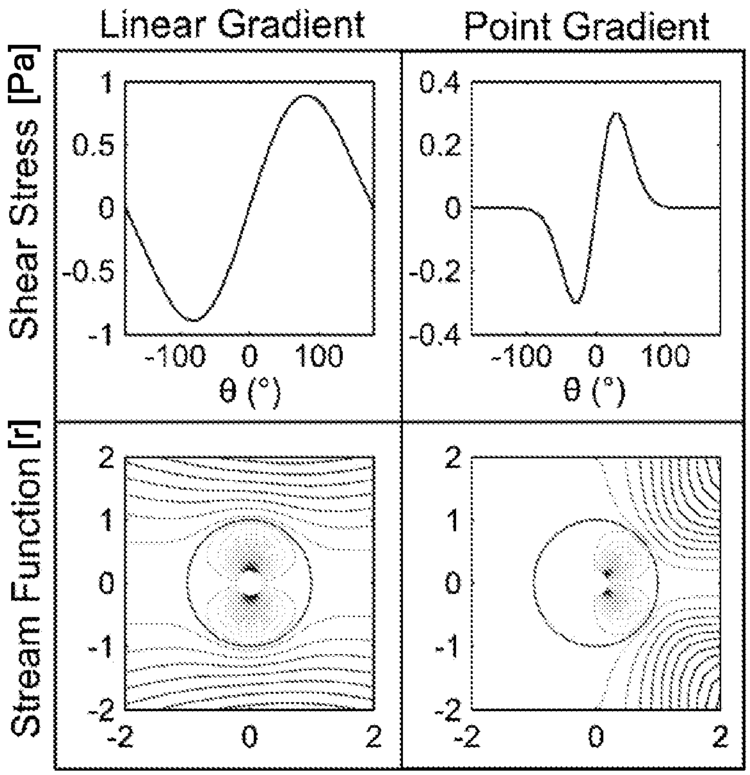
FIG. 3 shows a diagram of shear stresses caused in a droplet by a linear temperature gradient compared to a localized temperature gradient.

FIG. 3 shows a simulation of shear stress and stream function in the droplet 100 with a linear temperature gradient on the left side and with a nearly point-shaped temperature increase as shown in FIG. 2. The stream function in the lower half of FIG. 3 can be derived using a modified Stokes equation, and the total overall force 114 is calculated by integrating the shear stress gradient over the droplet surface. The OFT is driven by the steep temperature gradient, not by the absolute temperature. Therefore, with localized heating of the interface 108, the droplet 100, preferably consisting of a fluid with a low thermal conductivity, can be trapped and manipulated with a temperature perturbation in a range of less than about 10K.

Figures 4A, 4B, 4C, 4D, 4E, 4F:
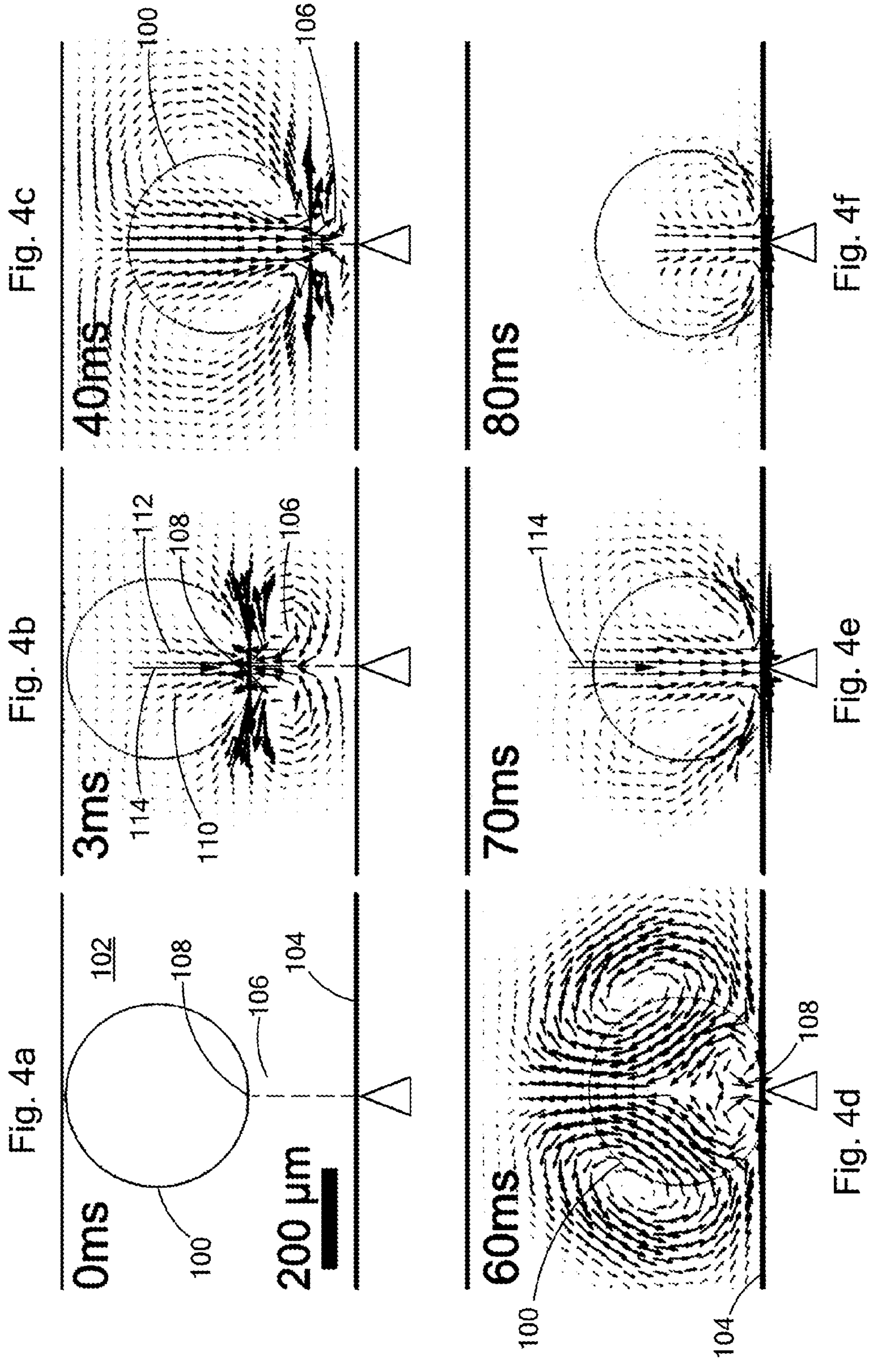
FIG. 4 shows a simulation of vertical droplet trapping by generating a symmetric Marangoni flow as illustrated in FIG. 1.

FIG. 4 illustrates a simulated sequence of an OFT operation, in which the droplet 100 is trapped by and attracted to the laser beam 106. Initially, according to FIG. 4*a*, the oil droplet 100 is suspended in an aqueous carrier fluid 102, remote from the substrate 104. The substrate 104 is transparent to the laser wavelength so that the laser beam 106 progresses from the outside through the substrate 104 into the carrier fluid 102, until it hits the interface 108 of the droplet 100. In FIG. 3, The droplet 100 is depicted to have a size of about 300 μm, a size that makes the droplet 100 visible to a human eye.

As shown in FIG. 4*b*, the laser beam 106 heats the interface 108 of the droplet 100 and causes the microvortex fronts 110 and 112 previously described in connection with FIG. 1. The resulting overall force 114 urges the droplet 100 toward the side of the interface 108.

As shown in FIG. 4*c*, the droplet 100 starts to move toward the laser beam 106. Eventually, as shown in FIG. 4*d*, the droplet contacts the substrate 104 so that the interface 108 cannot move any further. Accordingly, the overall force 114 causes a flattening of the trapped droplet 100 in the subsequent steps illustrated in FIGS. 4*e* and 4*f*.

Figure 5A:
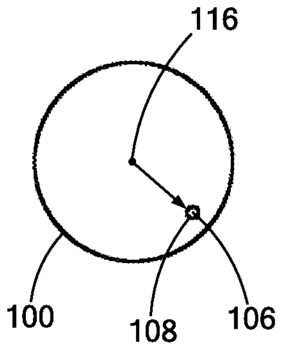
FIG. 5 illustrates a horizontal droplet translation by generating an asymmetrical Marangoni flow.

In addition to axial trapping with respect to the laser beam axis, it is also possible to cause a lateral movement of the droplet 100. As shown in FIG. 1, a laser beam centrally focused on the droplet 100 traps the droplet 100 in its lateral location relative to the laser beam. FIG. 5 shows a translatory movement caused by a laser beam focused toward an interface 108 that is initially offset from the center of symmetry 116 of the droplet 100 as illustrated in FIG. 5*a*. The local heat applied to the interface 108 causes unequal microvortex fronts so that an addition of all horizontal forces results in an overall horizontal phoretic force directed from the center of symmetry 116 of the droplet 100 toward the laser beam 106. The droplet is thus urged to occupy the symmetrical position shown in FIG. 1.

Figure 5B:
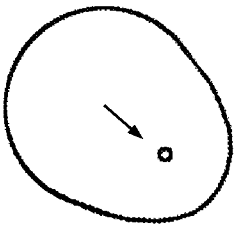
Figure 5C:
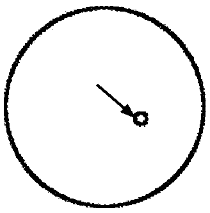
Figure 5D:
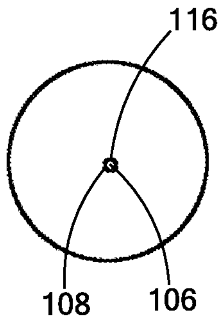

FIG. 5*b* through 5*d* shows that, in response to the local heat at interface 108, the droplet 100 expands its outer perimeter toward the interface 108 to embrace the interface 108 from all sides. Subsequently, the surface of the drop remote from the interface follows the movement and approaches the interface 108 as shown in FIG. 5*c*. Finally, the droplet 100 returns to a circular shape, and the interface 108 between the laser beam 106 and the droplet 100 is in the center of symmetry 116. FIG. 5 represents a recording of an actual oil droplet 100 being moved in the aqueous carrier fluid 102.

Thus, it has been shown that the OFT can trap oil droplets 100 using toroidal Marangoni flows, and manipulate them in a three-dimensional space, toward the laser beam and in two dimensions transverse to the laser beam 106. The OFT can manipulate single droplets 100 with high resolution and avoids the need for on-chip structures and specialized surfaces. OFT can be performed on plain, transparent surfaces including microscope slides forming the substrate 104. Thermocapillary forces are in the μN range so that OFT can generate translatory forces on a droplet that are many times stronger than forces generated with optoelectronic tweezers (OET) or optical tweezers.

Figure 6A:
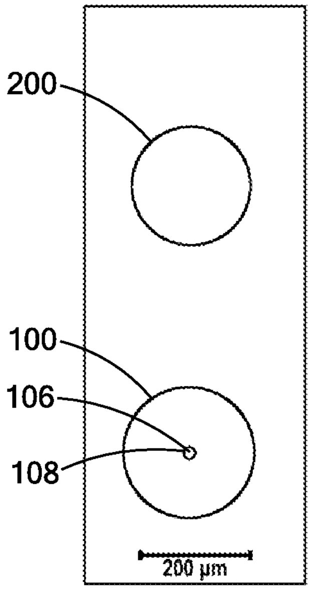
FIG. 6 illustrates three stages of merging two droplets by translating one droplet through an asymmetrical Marangoni flow.
Figure 6B:
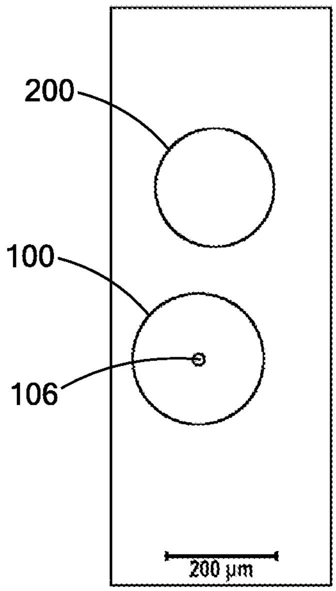
Figure 6C:
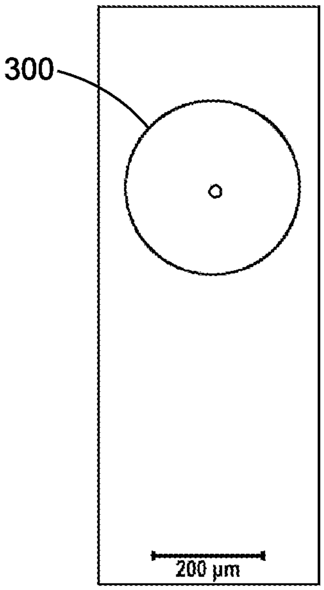

FIGS. 6*a* through 6*c* show an example of merging two droplets 100 and 200 with OFT. In the shown embodiment of FIG. 6*a*, both droplets 100 and 200 have a diameter of about 200 μm. The laser beam 106 points onto the interface 108 on the surface of droplet 100. As the laser beam 106 is moved toward the droplet 200, the droplet 100 follows the laser beam 106 because the overall IFT forces urge the droplet toward a symmetrical position with respect to the laser beam 106 as shown in FIG. 6*b* and described above in connection with FIG. 5. Once the droplet 100 moved by the laser beam 106 comes into contact with the droplet 200, the two droplets 100 and 200 merge into one larger droplet 300 as shown in FIG. 6*c*, thus reducing the surface compared to the two separate droplets 100 and 200 and optimizing the overall IFT forces.

Figure 7A:
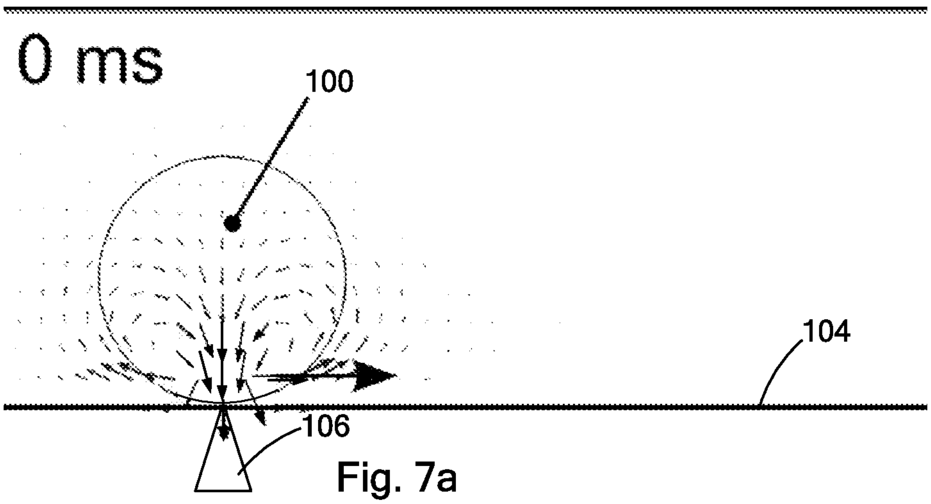
FIG. 7 shows a simulation of horizontal droplet translation by generating an asymmetrical Marangoni flow as utilized in FIGS. 4 and 5.
Figure 7B:
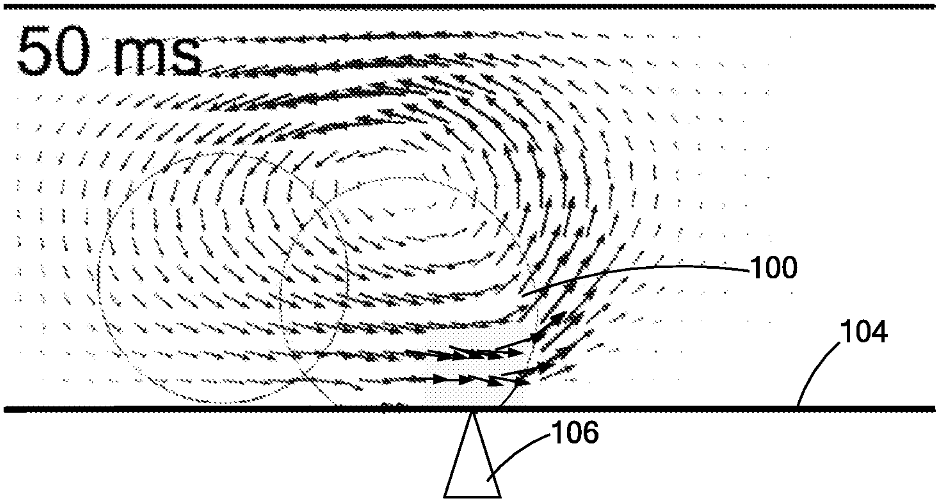
Figure 7C:
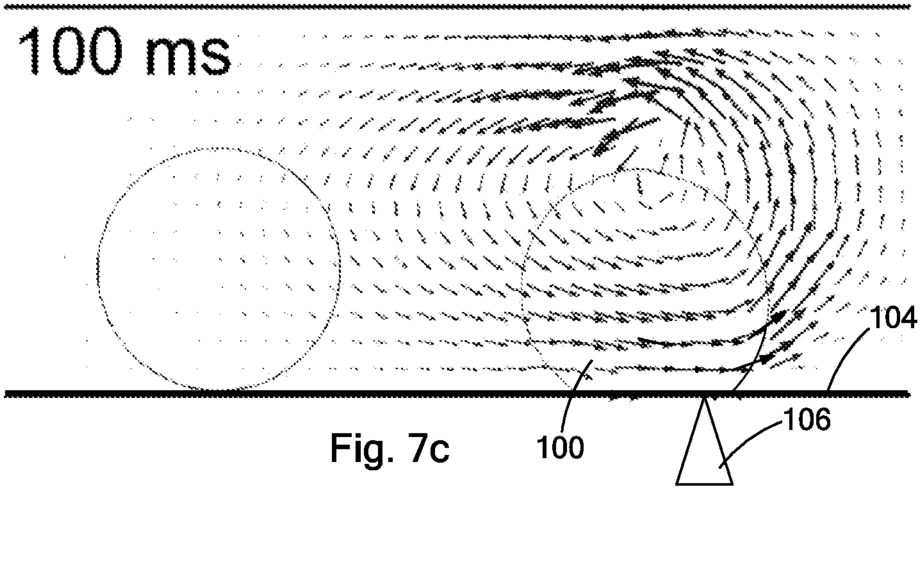

An example of a generally horizontal droplet translation is illustrated in FIGS. 7*a* through FIG. 7*c*. In FIG. 7*a* in a computer simulation. In FIG. 7*a*, the laser beam 106 points onto the interface 108 of the droplet 100. FIG. 7*a* corresponds to FIG. 1, where the laser beam 106 causes a symmetrical Marangoni flow. As the laser beam 106 is moved away from the center of the droplet 100 as shown in FIG. 7*b*, the Marangoni flow becomes asymmetrical, where the forces in the direction toward the laser beam 106 become greater than the opposing forces. These forces are indicated by weighted arrows. This phenomenon gives the impression as if the laser beam 106 were pulling the droplet 100 away from its original position. The droplet 100 moves along with the translatory movement of the laser beam 106 as shown in FIG. 7*c*. The movement continues until the laser beam comes to a rest or is turned off.

Notably, the timeline of FIGS. 7*a* through 7*c* indicates that a lateral translation by about twice the droplet diameter can be accomplished in about 100 ms. Such a movement corresponds to several millimeters per second and is visible to the human eye. Experiments have shown that OFT can trap droplets with μN forces and translate them with speeds up to about 10 mm/s.

Figure 8:
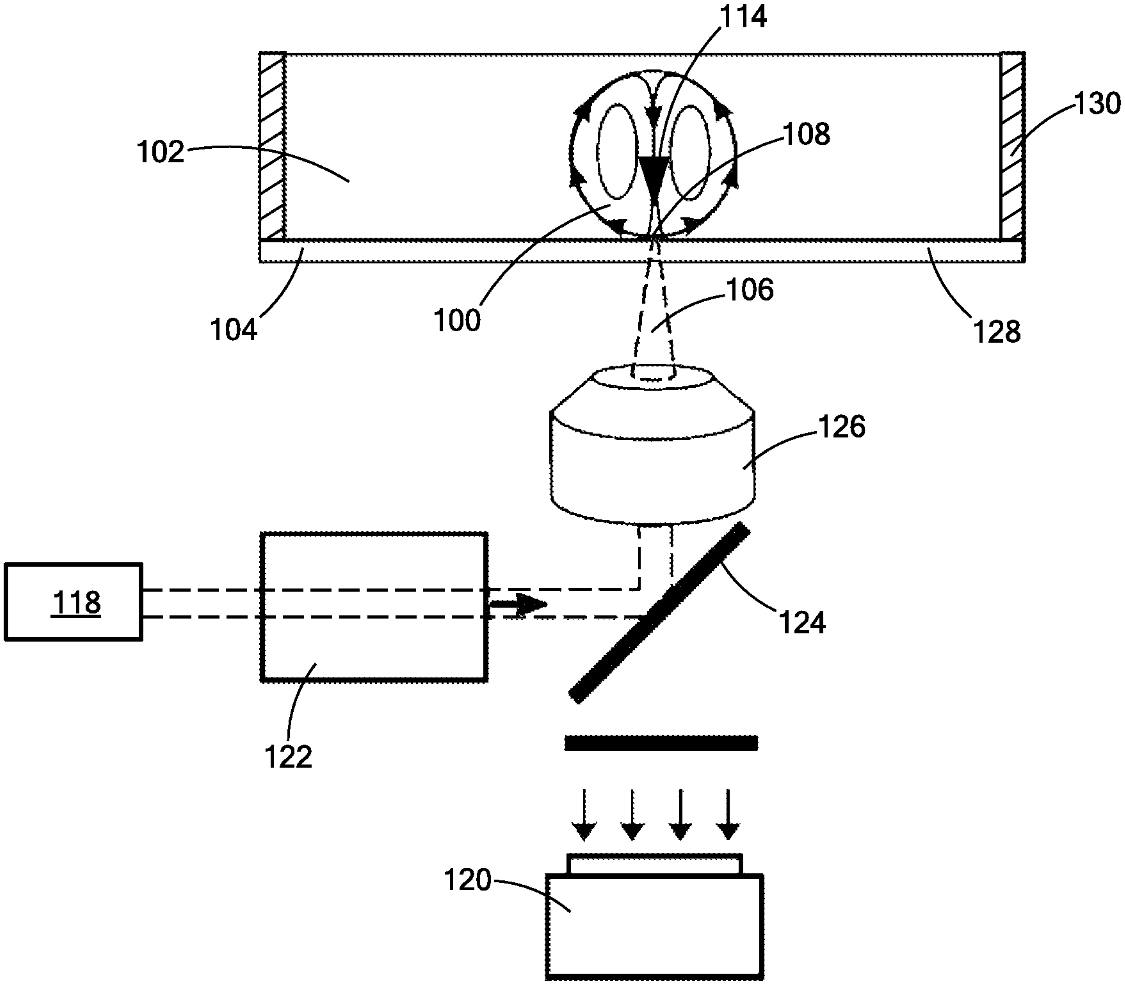
FIG. 8 shows an experimental setup for generating a Marangoni flow in droplets and for recording experimental observations.

FIG. 8 shows an example of an experimental setup compatible with a standard inverted fluorescence microscope. A diode laser 118 with a power of about 150 mW and a wavelength of about 405 nm is directed horizontally through a filter cube 122 with an Excitation of about 450 nm and an Emission of about 500 nm. A semi-transparent mirror 124 reflects the laser beam 106 at an angle of about 90° upward toward the substrate 104. A 10X objective 126 focuses the laser beam 106 to a spot size in the order of about 10 μm to about 100 μm depending on the aperture of the diode laser. Images are captured by a mounted CCD camera 120 below the semi-transparent mirror 124 for capturing light emitted by fluorescent particles.

The droplets 100 consist of oleic acid is dyed with solvent yellow #14. To obtain droplets of the size of fractions of millimeter, the oleic acid is mixed with about ten parts water. The mixture is then exposed to sonic vibrations to produce droplets of various diameters.

In the performed experiments, the focused laser incident on the liquid-liquid interface between the droplets 100 and the carrier liquid 102 creates a localized temperature increase of up to about 10K on the surface of the oil droplet 100. A corresponding decrease in surface tension occurs with the locally raised temperature. The surface tension singularity drives a toroidal microvortex within the droplet as shown in FIG. 1 (where two opposite fronts 110 and 112 of the microvortex are shown). OFT is driven by a temperature gradient, not absolute temperature. Therefore, with localized heating and or a low thermal conductivity fluid, one can trap and manipulate drops with temperature perturbation of less than and up to about 10K.

Droplets that were smaller than about 30 μm included Span 80 surfactant at a concentration of about 10% by volume. In some experiments, fluorescent particles (Magnaflux) were also added to the oleic acid for visualization. The oil-water emulsion was then placed with a pipette onto the substrate 104 composed of a glass slide 128 with a plastic ring 130 to contain the emulsion. In droplet translation experiments, the mechanical stage of the microscope, at least comprising the mirror 124, the objective 126, and the CCD camera 120, is moved laterally so that the droplet 100 moves relative to the surrounding carrier fluid 102, in this case water. While the focused laser beam 106 moved and the substrate remained stationary, the droplet 100 followed the laser beam 106.

By recording movements of the fluorescent particles in the oleic acid, the Marangoni flow and the microvortex fronts 110 and 112 in the droplet 100 can be recorded. The droplet 100, when suspended in the carrier fluid 102 is pulled vertically down towards the substrate by the Marangoni microvortex fronts 110 and 112 as shown in FIG. 4. The droplet 100 deforms slightly due to the flow. OFT relies on the tendency to achieve a symmetry of the microvortex fronts as illustrated in FIGS. 5*a*-5*d*).

From a vertical view along the direction of the incident laser beam 106 onto the droplet 100, the droplet 100 has a perimeter defining a projection of the droplet 100 onto a horizontal plane. If the interface 108 between the laser beam 106 and the droplet surface is near the perimeter of the droplet 110, the microvortex fronts 110 and 112 are asymmetric so that they pull the center 116 of the droplet projection on the horizontal plane toward the laser. This allows translating droplets 100 in a two-dimensional horizontal space as shown in FIGS. 5-7.

The high force in the microNewton (μN) range allows OFT to accommodate a range of droplet sizes of about 20-1000 μm. Translational velocities up to about 10 drop diameters per second can be achieved, with a maximum speed exceeding about 10 mm/s, corresponding to holding forces in the μN range. Currently, OFT is well suited to oil droplets because their thermal conductivity is very low compared to water (about 20% of the thermal conductivity of water). Because the applied heat remains localized, it forms sharp temperature gradients and larger shear forces. But generally, this technique is also applicable to aqueous droplets suspended in oil and even to gas or vapor bubbles in a carrier liquid that may be polar or non-polar.

While the present invention has been described in terms of preferred embodiments, it will be understood, of course, that the invention is not limited thereto since modifications may be made to those skilled in the art, particularly in light of the foregoing teachings.

What is claim is:

1. A method of moving droplets, the method comprising the following steps:

providing a droplet; and applying local heat to a surface portion of the droplet for an amount of time sufficient to create a Marangoni flow in the droplet that causes the droplet to move toward the local heat; wherein the droplet consists of a first substance, further comprising the steps of: providing a substrate suitable for holding a carrier liquid on a top surface; providing a carrier liquid consisting of a second substance generally not mixable with the first substance; placing the droplet in the carrier liquid; and placing the carrier liquid with the droplet on the top surface of the substrate before applying the local heat.

2. The method of claim 1, wherein Marangoni flow creates microvortices in the droplet causing the droplet to move.

3. The method of claim 1, wherein the first substance is a gas.

4. The method of claim 1, wherein the first and second substances are selected to have an interfacial tension negatively correlated to temperature.

5. The method of claim 1, wherein the second substance is a polar liquid and the first substance is a substantially nonpolar fluid.

6. The method of claim 5, wherein the first substance comprises oil.

7. The method of claim 5, wherein the second substance comprises water.

8. The method of claim 5, wherein the droplet is placed in the carrier liquid by creating an emulsion of the first substance in the second substance.

9. The method of claim 4, wherein the substrate is transparent.

10. The method of claim 4, wherein the heat is applied via a light beam originating under the substrate and propagating through the substrate and through the top surface of the substrate, the light beam comprising at least one wavelength for which the substrate and the carrier liquid are transparent.

11. The method of claim 10, wherein the droplet is suspended in the carrier liquid and the local heat is applied until the droplet contacts the substrate.

12. The method of claim 10, wherein the droplet perimeter has a center, wherein the light beam is directed at the surface portion of the droplet in a location outside the center and inside the perimeter of the projection and in a direction substantially perpendicular to the top surface of the substrate.

13. The method of claim 1, wherein the local heat is applied by a laser generating a laser beam with a wavelength in the visible spectrum that is converted to heat upon contact with the droplet surface.

14. The method of claim 13, wherein the local heat is applied by a diode laser.

15. The method of claim 13, wherein the wavelength is between about 400 nm and about 500 nm.

16. The method of claim 13, wherein the laser beam has a focal spot size of less than about 130 μm.

17. The method of claim 16, wherein the focal spot size is smaller than about 70 μm.

18. The method of claim 17, wherein the focal spot size is smaller than about 30 μm.

* * * * *